United States Patent
Kettley et al.

(10) Patent No.: US 8,250,543 B2
(45) Date of Patent: Aug. 21, 2012

(54) SOFTWARE TRACING

(75) Inventors: Paul Kettley, Hampshire (GB); Mark Andrew Cocker, Dorset (GB)

(73) Assignee: International Business Machines Corporation, Armonk, NY (US)

( * ) Notice: Subject to any disclaimer, the term of this patent is extended or adjusted under 35 U.S.C. 154(b) by 1063 days.

(21) Appl. No.: 11/938,527

(22) Filed: Nov. 12, 2007

(65) Prior Publication Data

US 2008/0127112 A1    May 29, 2008

(30) Foreign Application Priority Data

Nov. 23, 2006  (GB) ................... 0623355.5

(51) Int. Cl.
*G06F 9/44* (2006.01)
(52) U.S. Cl. ........................................... 717/128
(58) Field of Classification Search ........... 717/124–135
See application file for complete search history.

(56) References Cited

U.S. PATENT DOCUMENTS 7,543,279 B2 * 6/2009 Ayers et al. ................ 717/135
2002/0087949 A1 * 7/2002 Golender et al. ........... 717/124

OTHER PUBLICATIONS

IBM, "GDDM—Diagnosis", 1996, Version 3, Release 2, IBM Corporation, http://publibz.boulder.ibm.com/epubs/pdf/admd2a03.pdf, pp. i-xx, 1-143.*
Moore, Transaction Retry With Trace, ip.com, Jul. 1, 1987 (pp. 700-701).

* cited by examiner

*Primary Examiner* — Ted T Vo
(74) *Attorney, Agent, or Firm* — Novak Druce + Quigg LLP

(57) ABSTRACT

A method for generating trace information for an exception in a software application, the software application having a traced mode for the generation of trace information and an untraced mode, and the software application further having a retry point as a defined point in a series of instructions for the execution of the software application, the method comprising the steps of: commencing execution of the software application in the untraced mode; on execution of the retry point, recording execution state information for the retry point; on occurrence of an exception at an exception point in the software application, reverting execution to the retry point using the recorded execution state information and switching to the traced mode; and in response to a determination that the exception point is executed in the traced mode, causing execution of the software application to proceed in the untraced mode.

13 Claims, 5 Drawing Sheets

SOFTWARE TRACING

CROSS-REFERENCE TO RELATED APPLICATION

This application claims the benefit of British Patent Application No. GB0623355.5, filed on Nov. 23, 2006, which is incorporated by reference herein in its entirety.

FIELD OF THE INVENTION

The present invention relates to software problem diagnosis, and more particularly, to data capture techniques for facilitating software problem diagnosis.

BACKGROUND OF THE INVENTION

Problems can be encountered during the execution of a software application. For example, exceptions to the normal operation of the software application can manifest in various ways, including, but not limited to, the following: irregular or undesirable results; erroneous data; interruptions to execution; poor performance; excessive and unnecessary resource utilization; abnormal or premature termination; abnormal state; and a complete failure of the application. The process of problem determination for such exceptions can involve the use of many tools and techniques. Perhaps most notably, the capture of information relating to the state of a software application at the point of exception can be utilized. For example, techniques such as First Failure Data Capture (FFDC) can provide an automated snapshot of a system environment when an unexpected internal error occurs. Furthermore, the provision of memory and state "dumps" can be relied on in the event of software failure and is common in such software as operating systems.

The inadequacies of such data capture techniques in problem determination are familiar to those skilled in the art, and include the limited scope of the data collected at the point of exception. For example, it is not possible to retrieve state information leading up to an exception using such techniques. To address these deficiencies, software tracing is often employed to monitor and record software application state information at execution time. In this way, a rich set of valuable trace information can be recorded for the entire execution of a software application such that, in the event of an exception, state information for the entire period leading up to the exception is available to assist in problem determination.

However, recording trace information routinely during the execution of a software application is burdensome and imposes a further resource requirement over and above that of the software application itself, manifesting as a requirement for further storage and processing throughput. In some environments, the burden of generating and recording trace information at execution time can be so great that it exceeds the resource requirements of the software application itself. For this reason, a decision to include facilities for the generation and recording of trace information in a software application typically involves a compromise. The balance is between a resource-efficient, high-performance software application and a rich set of trace information for use in the event of exceptions at runtime. Generally, though, regardless of how the balance is struck for a particular software application, performance and reliability are likely to be compromised.

It would therefore be advantageous to provide the advantages of a software application that is free of the burden of routinely generating and recording trace information at runtime, while also retaining the richness of trace data provided where such trace information is generated and recorded in the event of an exception.

SUMMARY OF THE INVENTION

The present invention accordingly provides, in a first aspect, a method for generating trace information for an exception in a software application, the software application having a traced mode for the generation of trace information and an untraced mode, and the software application further having a retry point as a defined point in a series of instructions for the execution of the software application, the method comprising the steps of: commencing execution of the software application in the untraced mode; on execution of the retry point, recording execution state information for the retry point; on occurrence of an exception at an exception point in the software application, reverting execution to the retry point using the recorded execution state information and switching to the traced mode; and in response to a determination that the exception point is executed in the traced mode, causing execution of the software application to proceed in the untraced mode.

In this way, the software application executes in the traced mode during the retry execution of the software application between the defined retry point and the exception point. Notably, the software application returns to the untraced mode once the exception point is executed in the traced mode during the retry execution. Thus, trace information is generated for the retry of the software application only, and not for the entire execution of the software application. Further, trace information is not generated for the execution of the software application following the exception point during the retry execution, since the software application is returned to the untraced mode at this point. In this way, the extent of the execution of the software application which is undertaken in the traced mode is reduced to only that extent necessary to cover the retry execution. The impact of tracing the execution of the software application is therefore constrained to the retry execution.

The determination that the exception point is executed in the traced mode can include a determination that the software application enters an exception state at the exception point in the traced mode.

Alternatively, the determination that the exception point is executed in the traced mode can include a determination that the retry point is to be removed from a call stack for the software application.

The execution state information can include all information required to allow the execution of the software application to restart from the retry point.

The present invention accordingly provides, in a second aspect, an apparatus for generating trace information for an exception in a software application, the software application having a traced mode for the generation of trace information and an untraced mode, and the software application further having a retry point as a defined point in a series of instructions for the execution of the software application, the apparatus comprising: means for commencing execution of the software application in the untraced mode; means for, on execution of the retry point, recording execution state information for the retry point; means for, on occurrence of the exception at an exception point in the software application, reverting execution to the retry point in the traced mode using the recorded execution state information; and means for, in response to a determination that the exception point is executed in the traced mode, causing execution of the software application to proceed in the untraced mode.

The present invention accordingly provides, in a third aspect, an apparatus comprising: a central processing unit; a memory subsystem; an input/output subsystem; and a bus subsystem interconnecting the central processing unit, the memory subsystem, the input/output subsystem; and the apparatus as described above.

The present invention accordingly provides, in a fourth aspect, a computer program element, or computer-readable storage medium, comprising computer program code, which, when loaded into a computer system and executed thereon, causes the computer to perform the steps of a method as described above.

BRIEF DESCRIPTION OF THE DRAWINGS

A preferred embodiment of the present invention is described below in more detail, by way of example only, with reference to the accompanying drawings, in which.

DETAILED DESCRIPTION OF THE PREFERRED EMBODIMENTS

Figure 1:
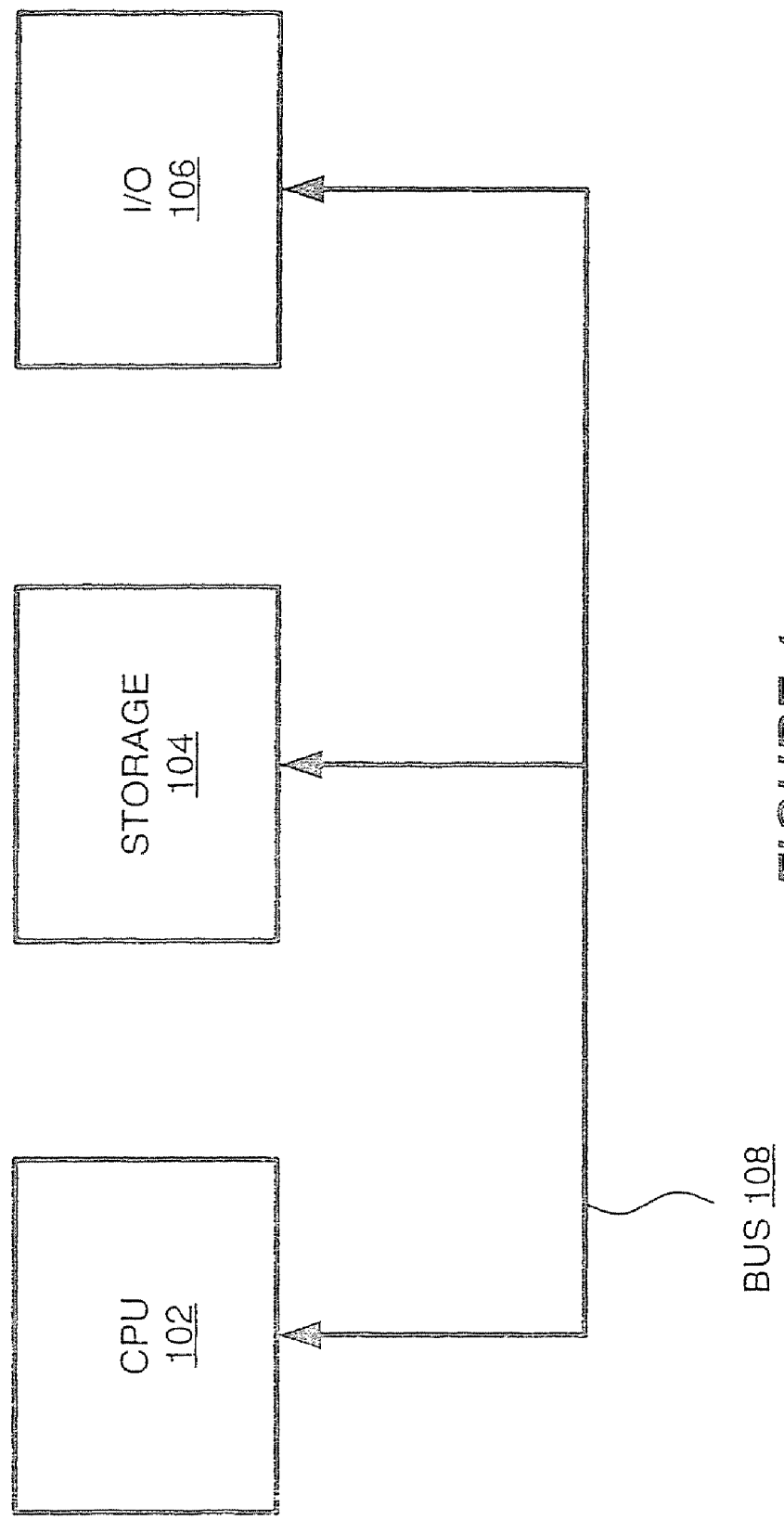
FIG. 1 is a block diagram of a computer system suitable for the operation of embodiments of the present invention.

FIG. 1 is a block diagram of a computer system suitable for the operation of embodiments of the present invention. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
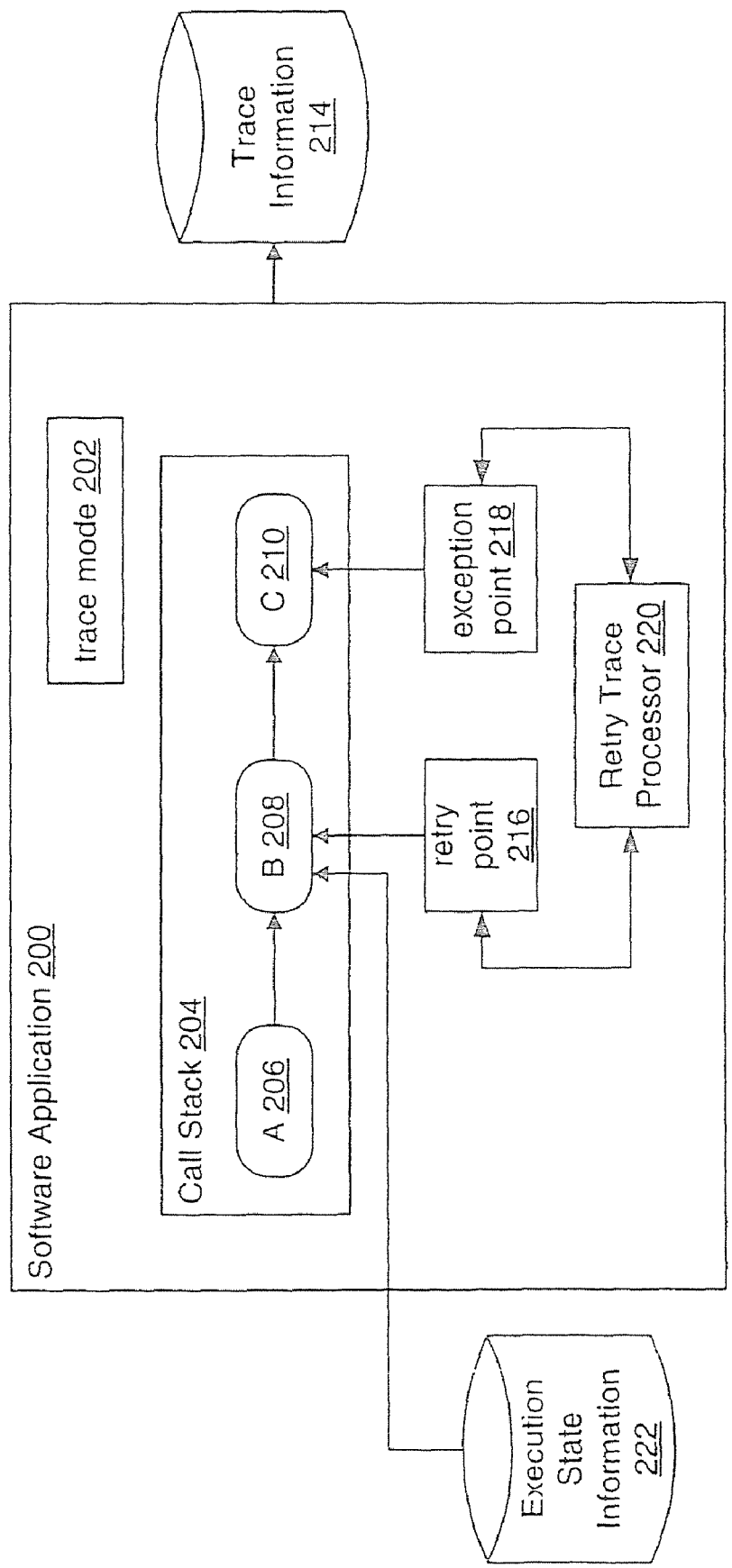
FIG. 2 is a block diagram of a software application in execution in accordance with an exemplary embodiment of the present invention.

FIG. 2 is a block diagram of a software application 200 in execution in accordance with an exemplary embodiment of the present invention. The software application 200 includes a call stack 204 which is a stack data stricture of software routines forming part of, or used by, the software application 200. The call stack resides within a storage of a computer system executing the software application 200. The software routines A 206, B 208, and C 210 are illustrated as stored in the call stack 204. The call stack is an ordered data structure such that the order in which software routines call each other is stored within the call stack by virtue of the arrangement of software routines in the call stack. In the example of FIG. 2, software routine A 206 called software routine B 208, which in turn called software routine C 210. Each software routine will normally execute to completion and return to the software routine which called it. Thus, when software routine C 210 completes, execution will return to software routine B 208. Completed software routines are removed from the call stack as they return to respective calling software routines.

Software routines A 206, B 208, and C 210 are executable software components constituting part of, or being called by, the software application 200. For example, the software routines can be functions, procedures, subroutines, macros, application programming interface routines, programs, subprograms, software methods or any other executable program component. Software routines A 206, B 208, and C 210 will include a series of instructions to the CPU 102 of a computer system for their execution.

The software application 200 is operable to generate trace information 214 which is recorded in a data store. In this regard, the software routine is operable in one of at least two modes including a trace mode 202. In the trace mode, trace information is recorded to the trace information data store 214. In the absence of the trace mode, such trace information is not recorded. Trace information can include, by way of example only: the state and content of data structures, variables, flags and other data items used by or included in the software application 200; descriptive information relating to the state or functioning of the software application 200; failure data information; storage dumps; software routine entry point information; software routine exit point information; call stack information: and exception information. The trace mode 202 is switchable to an "on" and "off" state at runtime. For example, the trace mode 202 can be a global flag accessible to all software routines in, and used by, the software application 200. In this way, software routines are able to determine whether to generate and record trace information by interrogating the global flag. Other techniques for the operation of a trace mode 202 will be apparent to those skilled in the art. When the trace mode 202 is "on" trace information 214 is generated, which can affect system performance. When the trace mode 202 is "off," trace information 214 is not generated, and system performance is not affected.

While the trace mode 202 has been described as a polarized "on" and "off" system of operation, it will be apparent to those skilled in the art that varying degrees of trace mode 202 can be implemented and such variable tracing modes are entirely compatible with the exemplary embodiments of the present invention described herein. In particular, the trace mode 202 "off" can, in practice, be implemented as a "reduced" trace mode wherein trace information is generated at a coarser granularity, or a lower frequency, than in the trace mode 202 "on." In this regard the characteristics of the trace mode 202 which are pertinent to the present description are that the trace mode 202 "off" is less burdensome (in that it may be less resource intensive, require less processing overhead, and/or be less storage intensive, for example) than the trace mode 202 "on."

The software application 200 further includes an identification of an exception point 218. The exception point 218 is a nominal identifier for the purpose of explanation only of a location in a series of instructions forming part of the software application 200 (or called by the software application 200) where an exception occurs at execution time. Such an exception can include, for example: irregular or undesirable results; erroneous data; interruptions to execution, poor performance; excessive and unnecessary resource utilization; abnormal or premature termination; abnormal state; and a complete failure of the application. Such exceptions are detectable by facilities such as error detection routines, First Failure Data Capture (FFDC) facilities, exception handlers, error handlers and operating system interrupt or error handlers. In the example of FIG. 2, software routine C 210 is illustrated as including the exception point 218, indicating that it is within software routine C 210 that an exception will occur during execution.

The software application 200 further includes a retry point 216 which is a defined point in a series of instructions for the execution of the software application 200. The retry point 216 can be defined by a software developer or an automated retry point defining routine. Such a routine may operate by scanning software routines comprising the software application 200 and insert retry point 216 using defined criteria. For example, an aspect-oriented software environment may weave retry point software aspects into software methods in accordance with an aspect definition. Such an aspect definition can include, for example: the entry or exit point of every method; every occurrence of a particular method or function call; every method executing at a regular frequency of temporal distance; and the occurrence of a developer inserted indicator.

The retry point 216 is a defined point in the execution of the software application for retrying execution of the software application 200 in the event of an exception. When executed, the retry point 216 records execution state information 222 to a data store. The execution state information includes all information required to allow the execution of the software application 200 to restart from the retry point 216. For example, the execution state information can include the call stack state, local and global variable information, and pertinent content in the memory of the computer system. A retry trace processor 220 is operable to detect an exception at exception point 218 and identify the appropriate retry point 216. The retry trace processor 220 is then operable to retry the execution of the software application 200 commencing from the retry point 216. An important part of the operation of the retry trace processor 220 and the retry point 216 is that the trace mode 202 is turned "on" when execution is retried from the retry point 216. Subsequently, when the exception point 218 has been executed during the retry, the trace mode 202 is turned "off."

During retry, the trace mode 202 can be turned "on" by the retry trace processor 220, or alternatively by the software routine B 208 as part of the retry point 216. Subsequently, the trace mode 202 can be turned "off" in one of two main ways. Firstly, if the exception point 218 causes an exception during the execution from the retry point 216, the retry trace processor 220 will be triggered and the trace mode 202 can be turned to "off" by the retry trace processor 220. Alternatively, it is possible that the exception point 218 does not cause an exception during execution from the retry point 216. This is a typical occurrence in software problem determination—problems caused by such aspects as timing and synchronization may not be reproduced on subsequent execution of a software routine. In particular, the very change to a trace mode 202 of "on" can cause timing differences which manifest in an exception which is not reproducible. In this scenario, the trace mode 202 can be switched to "off" when the software routine B 208 is to be removed from the call stack 204. The removal of software routine B 208 from the call stack 204 is an indication that the software routine C 210 executed without exceptions, and is a useful trigger to deactivate the trace mode 202. Thus, regardless of whether the execution from the retry point 216 results in an exception at the exception point 218, the trace mode 202 can be switched to an "off" state to prevent the undesirable burden of ongoing tracing during the subsequent execution of software application 200.

In this way the software application executes with the trace mode 202 "on" during the retry execution of the software application 200 between the define retry point 216 and the exception point 218. Notably, the software application returns to the trace mode 202 "off" once the exception point 218 is executed with trace mode "on" during the retry execution. Thus, trace information 214 is generated for the retry of the software application 200 but not for the entire execution of the software application 200. Further, trace information 214 is not generated for the execution of the software application 200 following the exception point during the retry execution, since the software application 200 is returned to the trace mode 202 "off." In this way, the extent of the execution of the software application 200 which is undertaken with trace mode 202 "on" is reduced to only that extent necessary to cover the retry execution. The impact of tracing the execution of the software application 200 is therefore limited to the retry execution.

While many of the elements of FIG. 2 are represented as residing within the software application 200, it will be apparent to those skilled in the art that these elements may alternatively reside outside the software application 200 and instead reside elsewhere within a computer system, such as in the storage of the computer system, or may form part of another aspect of the computer system such as a part of the operating system. In particular, the call stack 204 data structure may be organized to reside outside the software application 200 itself but within the storage of the computer system such as a memory of the computer system. Similarly, the retry trace processor may be a facility provided in software or hardware outside the software application itself, such as part of an operating system or a service component associated therewith.

Figure 3:
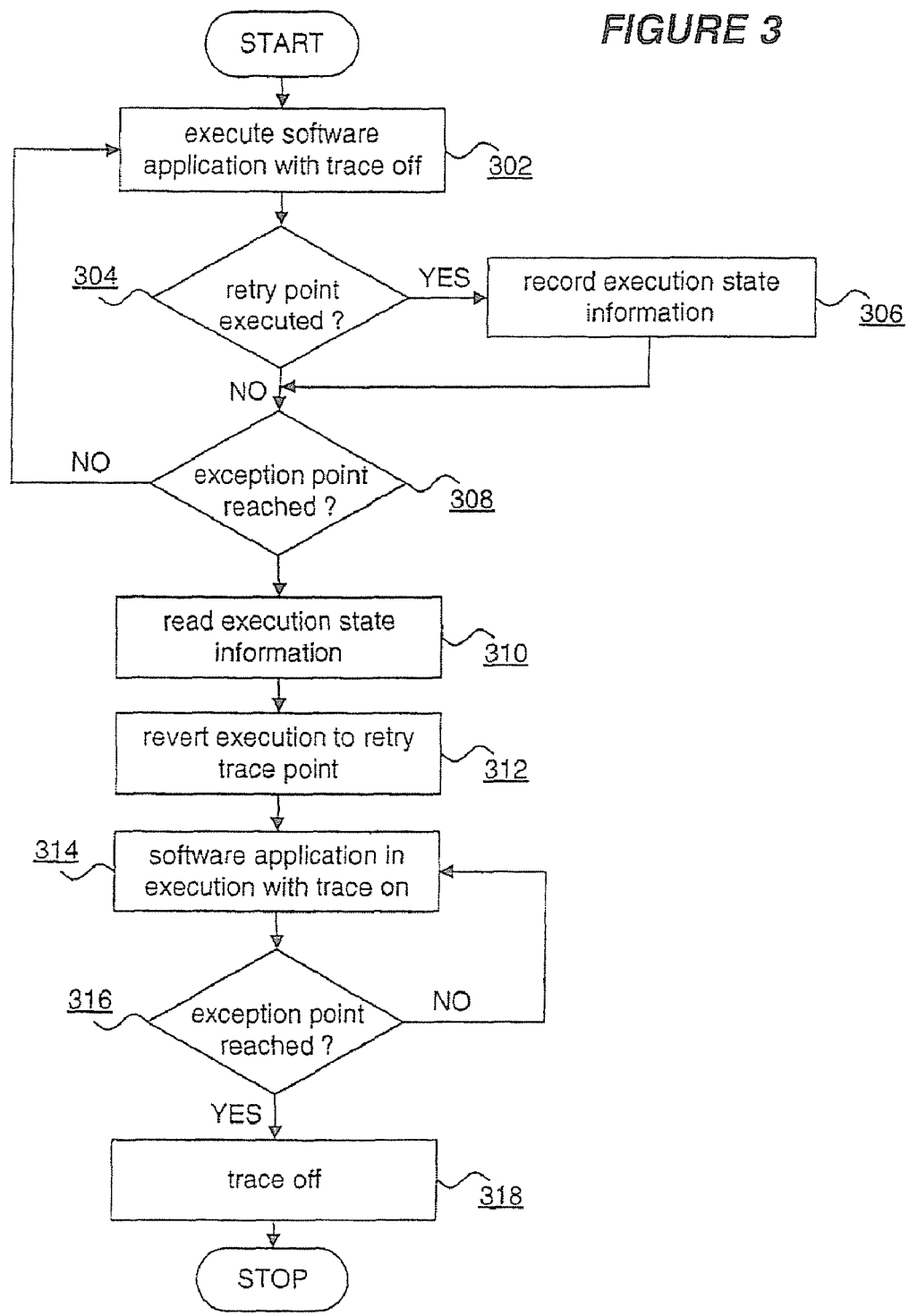
FIG. 3 is a flowchart of a method in accordance with an exemplary embodiment of the present invention.

FIG. 3 is a flowchart of a method in accordance with an exemplary embodiment of the present invention. At step 302, the software application 200 executes with trace mode 202 off. At step 304, the method determines if a retry point 216 is executed. If a retry point is executed, the method records execution state information at step 306. At step 308, the method determines if an exception point 218 is reached 308. If an exception point 218 is reached, the retry trace processor 220 reads the execution state information 222 at step 310 and reverts execution to the retry trace point 216 at step 312. At step 314 the software application executes with trace mode 202 "on" until the exception point is reached at step 316. Once the exception point is reached at step 316 the trace mode 202 is set to "off".

The determination as to whether the exception point is reached 316 is preferably made by recognizing that an exception has occurred during the retry execution, or alternatively by recognizing that the software routine B 208 having the retry point 216 is to be removed from the call stack 204.

Figure 4:
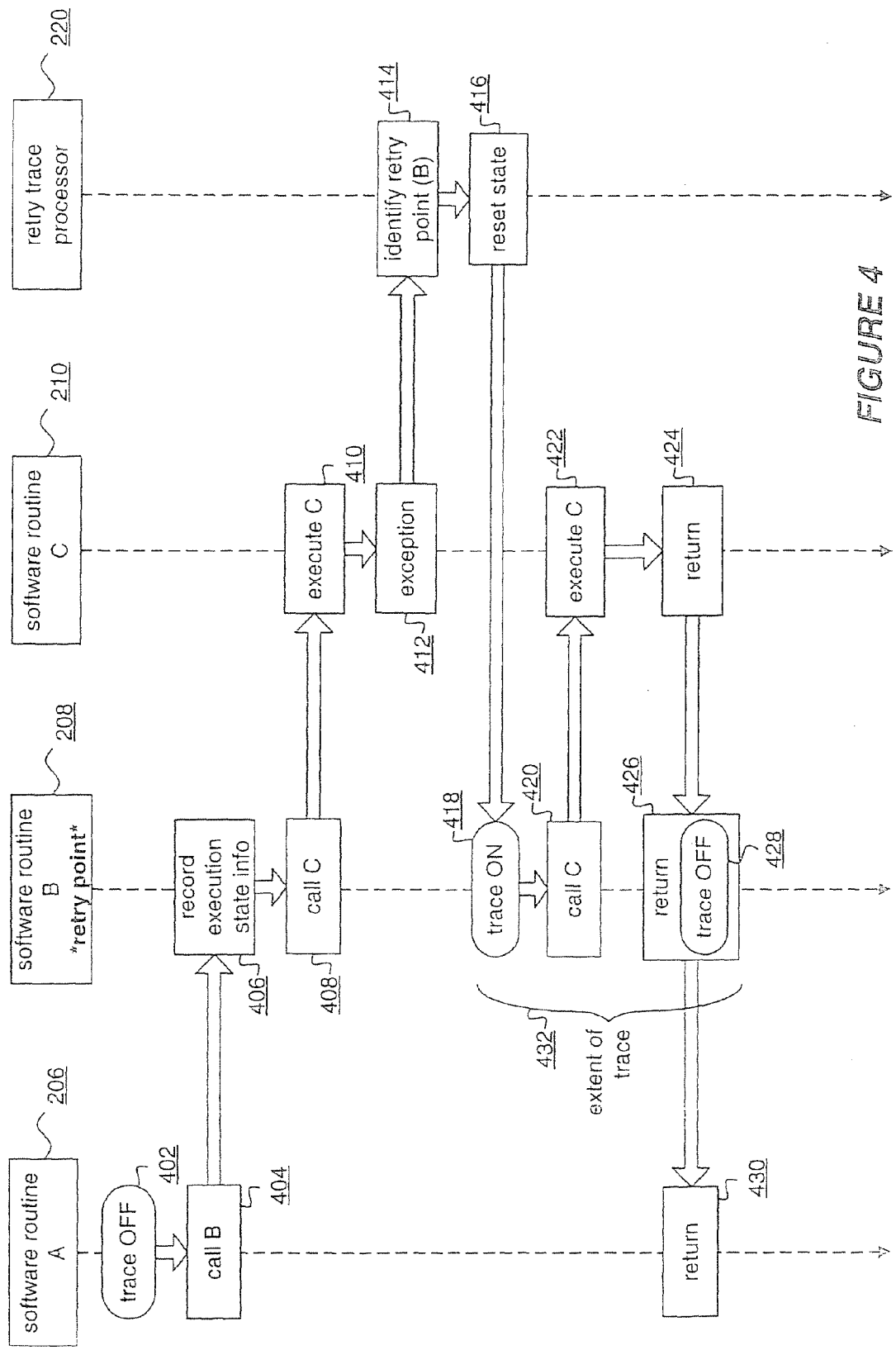
FIG. 4 is a state diagram illustrating an exemplary embodiment of the present invention in use for the software application of FIG. 2.

FIG. 4 is a state diagram illustrating an exemplary embodiment of the present invention in use for the software application 200 of FIG. 2. Initially, at 402, the software application 200 commences execution in software routine A 206 with the trace mode 202 "off." Software routine A 206 calls software routine B 208 at 404. Software routine B 208 is identified as including the retry point 216. Execution state information 222 is recorded at 406 and subsequently at 408 software routine B 208 calls software routine C 210. At 410, software routine C executes, and an exception occurs at 412 during execution. The exception is detected by the retry trace processor 220 at 414, and the retry trace processor 220 identifies the retry trace point 208 at 414. Subsequently, at 416, the retry trace processor 220 resets the state of the software application 200 using the execution state information 222 for the retry point 216 in order to revert execution to the retry point 216 in software routine B 208. At 418, software routine B 208 initially turns trace mode 202 to "on" before undertaking to call software routine 210 at 420. Alternatively, the trace mode 202 can be changed to "on" by the retry trace processor 220 as part of its processing at 416. At 422 the software routine C 210 executes to completion (with no exception) and returns at 424 to the calling software routine B 208. Subsequently, at 426 software routine B turns trace mode 202 to "off" as part of its return to calling routine A 206. At 430 software routine A also returns to its calling routine. In this way the extent of the execution of software application 200 which has trace mode 202 "on" is limited to only that extent indicated at 432. All other aspects of the execution of the software application 200 were undertaken with trace mode 202 "off".

Figure 5:
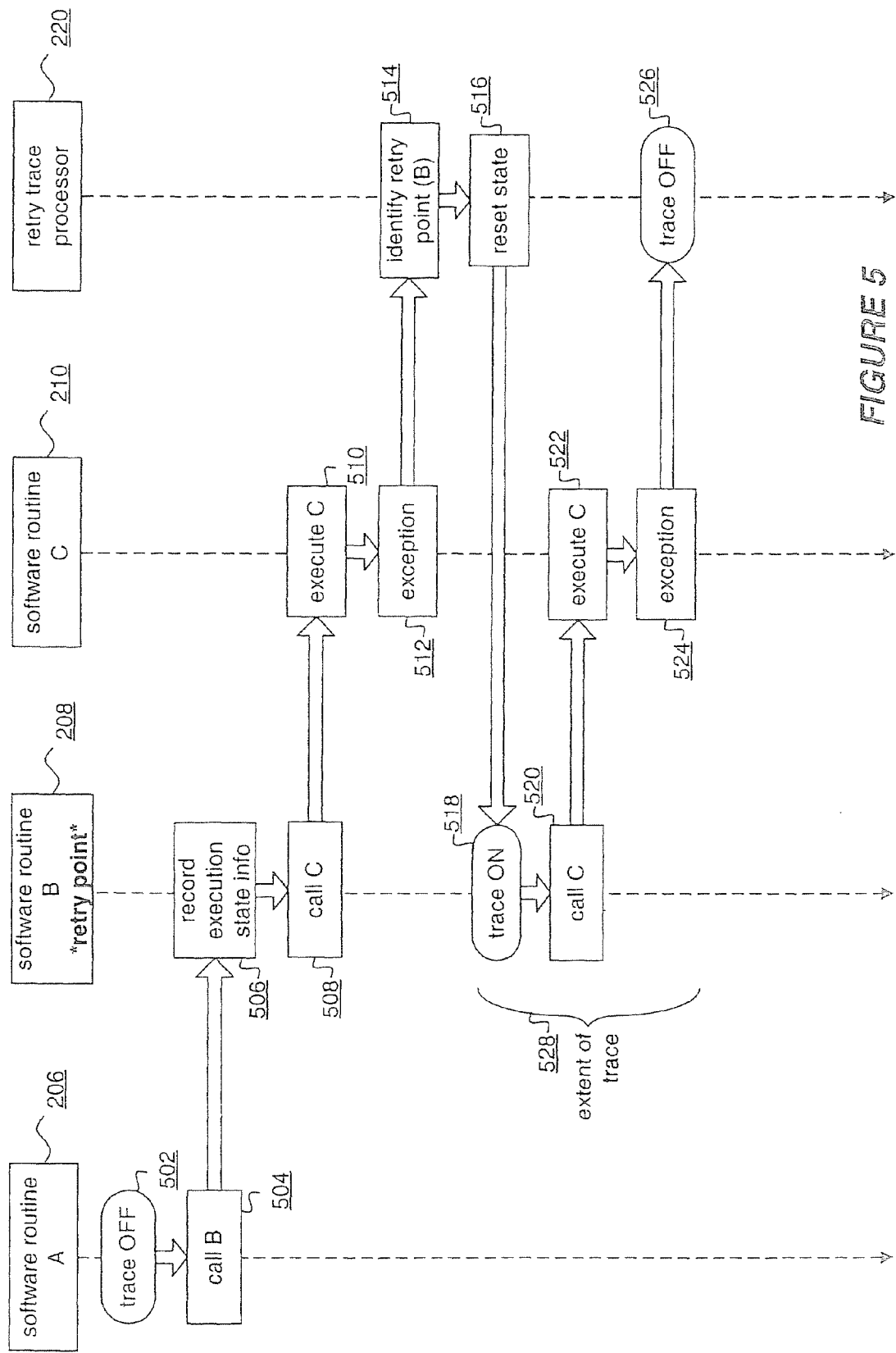
FIG. 5 is a further state diagram illustrating an exemplary embodiment of the present invention in use for the software application of FIG. 2.

FIG. 5 is a further state diagram illustrating an exemplary embodiment of the present invention in use for the software application 200 of FIG. 2. Initially, at 502, the software application 200 commences execution in software routine A 206 with the trace mode 202 "off". Software routine A 206 calls software routine B 208 at 504. Software routine B 208 is identified as including the retry point 216. Execution state information 222 is recorded at 506 and subsequently at 508 software routine B 208 calls software routine C 210. At 510, software routine C executes and an exception occurs at 512 during execution. The exception is detected by the retry trace processor 220 at 514, and the retry trace processor 220 identifies the retry trace point 216 at 514. Subsequently, at 516, the retry trace processor 220 resets the state of the software application 200 using the execution state information 222 for the retry point 216 in order to revert execution to the retry point 216 in software routine B 208. At 518, software routine B 208 initially turns trace mode 202 to "on" before undertaking to call software routine 210 at 520. Alternatively, the trace mode 202 can be changed to "on" by the retry trace processor 220 as part of its processing at 516. At 522 the software routine C 210 executes and an exception occurs at 524 during execution. The exception is detected by the retry trace processor 220 at 526 which subsequently turns the trace mode 202 to "off". In this way the extent of the execution of software application 200 which has trace mode 202 "on" is limited to only that extent indicated at 528. All other aspects of the execution of the software application 200 were undertaken with trace mode 202 "off".

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk, or other computer-readable medium, and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method for generating trace information for an exception in a software application, the software application having a traced mode for the generation of trace information and an untraced mode, and the software application further having a plurality of retry points, each of the plurality of retry points providing a pre-defined point in a series of instructions for the execution of the software application, the method comprising performing, via a processor, the steps of:
commencing execution of the software application in the untraced mode;
on execution of a one of the plurality of retry points, recording execution state information for the one of plurality of retry points;
automatically, on occurrence of an exception at an exception point in the software application after the execution of the one of the plurality of retry points in the untraced mode, prior to an execution of a subsequent one of the plurality of retry points, and without altering the software application, reverting execution to the one of the plurality of retry points using the recorded execution state information and switching to the traced mode;
in response to a determination that the exception point is executed in the traced mode, automatically causing execution of the software application to proceed in the untraced mode; and
repeating the steps of commencing, recording, reverting, and causing for subsequent portions of the software application.

2. The method of claim 1, wherein the determination that the exception point is executed in the traced mode includes a determination that the software application enters an exception state at the exception point in the traced mode.

3. The method of claim 1, wherein the determination that the exception point is executed in the traced mode includes a determination that the one of the plurality of retry points is to be removed from a call stack for the software application.

4. The method of claim 1, wherein the execution state information includes all information required to allow the execution of the software application to restart from the one of the plurality of retry points.

5. An apparatus for generating trace information for an exception in a software application, the software application having a traced mode for the generation of trace information and an untraced mode, and the software application further having a plurality of retry points, each of the plurality of retry points providing a pre-defined point in a series of instructions for the execution of the software application, the apparatus comprising:

a processor;

means for configuring the processor for commencing execution of the software application in the untraced mode;

means for, on execution of a one of the plurality of retry points, configuring the processor for recording execution state information for the one of the plurality of retry points;

means for, on occurrence of the exception at an exception point in the software application after the execution of the one of the plurality of retry points in the untraced mode, prior to an execution of a subsequent one of the plurality of retry points, and without altering the software application, configuring the processor for automatically reverting execution to the one of the plurality of retry points in the traced mode using the recorded execution state information;

means for, in response to a determination that the exception point is executed in the traced mode, configuring the processor for automatically causing execution of the software application to proceed in the untraced mode; and means for configuring the processor to repeat the commencing, recording, reverting, and causing for subsequent portions of the software application.

6. The apparatus of claim 5, wherein the determination that the exception point is executed in the traced mode includes a determination that the software application enters an exception state at the exception point in the traced mode.

7. The apparatus of claim 5, wherein the determination that the exception point is executed in the traced mode includes a determination that the one of the plurality of retry points is to be removed from a call stack for the software application.

8. The apparatus of claim 5, wherein the execution state information includes all information required to allow the execution of the software application to restart from the one of the plurality of retry points.

9. An apparatus comprising:
a central processing unit;
a memory subsystem;
an input/output subsystem;
a bus subsystem interconnecting the central processing unit, the memory subsystem, the input/output subsystem; and
an apparatus configured to operate in conjunction with the central processing unit for generating trace information for an exception in a software application, the software application having a traced mode for the generation of trace information and an untraced mode, and the software application further having a plurality of retry points, each of the plurality of retry points providing a pre-defined point in a series of instructions for the execution of the software application, the apparatus being further configured to:
commence execution of the software application in the untraced mode;
on execution of a one of the plurality of retry points, record execution state information for the one of the plurality of retry points;
automatically, on occurrence of the exception at an exception point in the software application after the execution of the one of the plurality of retry points in the untraced mode, prior to an execution of a subsequent one of the plurality of retry points, and without altering the software application, revert execution to the one of the plurality of retry points in the traced mode using the recorded execution state information;
in response to a determination that the exception point is executed in the traced mode, automatically cause execution of the software application to proceed in the untraced mode; and
repeat the commencing, recording, reverting, and causing for subsequent portions of the software application.

10. A non-transitory computer-readable medium comprising computer program code that when loaded into a computer system and executed thereon causes the computer, with respect to a software application having a traced mode for the generation of trace information, an untraced mode, and a plurality of retry points, each of the plurality of retry points providing a pre-defined point in a series of instructions for the execution of the software application, to perform the steps of:
commencing execution of the software application in the untraced mode;
on execution of a one of the plurality of retry points, recording execution state information for the one of the plurality of retry points;
automatically, on occurrence of an exception at an exception point in the software application after the execution of the one of the plurality of retry points in the untraced mode, prior to an execution of a subsequent one of the plurality of retry points, and without altering the software application, reverting execution to the one of the plurality of retry points using the recorded execution state information and switching to the traced mode;
in response to a determination that the exception point is executed in the traced mode, automatically causing execution of the software application to proceed in the untraced mode;
repeating the steps of commencing, recording, reverting, and causing for subsequent portions of the software application.

11. The non-transitory computer-readable medium of claim 10, wherein the determination that the exception point is executed in the traced mode includes a determination that the software application enters an exception state at the exception point in the traced mode.

12. The non-transitory computer-readable medium of claim 10, wherein the determination that the exception point is executed in the traced mode includes a determination that the one of the plurality of retry points is to be removed from a call stack for the software application.

13. The non-transitory computer-readable medium of claim 10, wherein the execution state information includes all information required to allow the execution of the software application to restart from the one of the plurality of retry points.

* * * * *